UNITED STATES PATENT OFFICE.

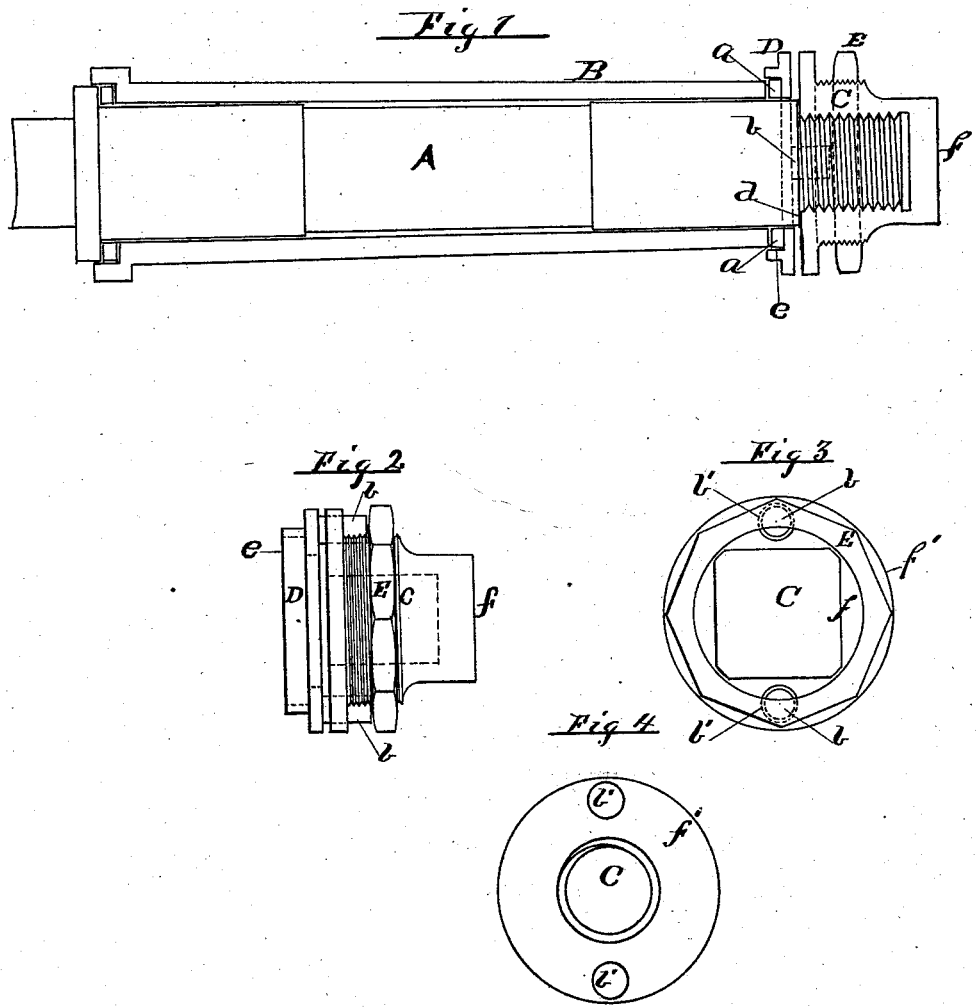

EDGAR P. HOLLY, OF LOCKPORT, NEW YORK.

AXLE-NUT FOR VEHICLES.

SPECIFICATION forming part of Letters Patent No. 247,916, dated October 4, 1881.

Application filed July 18, 1881. (Model.)

*To all whom it may concern:*

Be it known that I, EDGAR P. HOLLY, of Lockport, in the county of Niagara and State of New York, have invented a new and Improved Axle-Nut, of which the following is the specification.

Heretofore the nuts used at the end of axle to retain the wheel of a carriage or wagon in position have been allowed to screw up home or to the axle-shoulder, and the adjustment of the wheel made good by the use of leather washers between the nut and box, which are replaced as they wear, or by taking up the wear with set-screws threaded through the nut. The objections to the latter way are that there is much difficulty in adjusting evenly with the separate set-screws, and that the washers are liable to turn on the ends of the set-screws and wear away both screws and washer, and at the same time produce a noise more disagreeable than the rattle of a wheel.

In my invention these objections are entirely removed, as I retain the follower in the same position all the time, or, in other words, I prevent absolutely any rotary motion, while at the same time it is perfectly free to move out or in as the washers wear away and without the use of set-screws.

The objections to the ordinary nut are as follows: The washers soon wear a little and the wheel begins to rattle before the washer has worn away sufficiently to allow of the introduction of a new ring, and so the wheel continues to rattle and wear until another can be inserted. When a wheel is but partially packed or in the condition described, the wearing away of the box and axle-shoulder is much more rapid than when always kept well up to the washers and never allowed the least endwise motion.

The object of my invention is to provide a nut for this purpose which contains in itself the necessary requirements, so that the wheel may always be kept in its proper position and dispense with the necessity of replacing the packing-rings, and by which all looseness can be immediately taken up without removing the nut from the axle.

The invention consists in making that part that holds the ring-washer (and consequently that part which comes in contact with the axle-box) separate from the body of the nut proper, and so constructed that it cannot revolve with the wheel, and by means of a follower-nut screwed on the outside of the nut proper be kept up to the axle-box at all times.

In the accompanying drawings, in which similar letters of reference indicate like parts, Figure 1 is a longitudinal section of my device, shown in its position attached to the axle of a carriage or wagon. Fig. 2 is an exterior view of the same detached from the axle. Fig. 3 is a plan view of Fig. 2, and Fig. 4 is a plan showing the end of the nut opposite the end shown by Fig. 3.

In Fig. 1 A represents the axle; B, the axle-box. C is the nut. D is the follower-ring and contains a single ring of leather packing, $a$. E is the follower-nut, and is tightly screwed on the outer circumference of the nut C.

The follower-ring D is provided at opposite sides with two projecting pins or studs, $b\ b$, (shown on Fig. 1 by the dotted lines at $b$,) which pass through corresponding holes $b'\ b'$ in the flange $f'$, which forms the inner end of the nut C. The studs $b\ b$ are shown in Figs. 2 and 3 and the holes $b'\ b'$ in Figs. 3 and 4. The studs $b\ b$ pass loosely through the holes $b'\ b'$ and rest against the follower-nut E, which is screwed on the outside of the nut C from the outer end. Thus the follower-nut E is on the outer side of the flange $f'$, the follower-ring D is on the inside of the flange $f'$ and is free to move as the follower-nut E is screwed in or out. The nut C is screwed up home or tight against the axle-shoulder $d$, and with it the follower-ring D and follower-nut E. The inside of the follower-ring D is provided with an annular space, $e$, containing a single ring or washer, $a$, which is in contact with the end of the axle-box B. As the ring $a$ wears away the looseness caused thereby is taken up by screwing the follower-nut E farther up toward the flange $f'$ by applying a wrench at the outer end of hub to the said nut E. The follower-ring D is bored out to fit loosely on the end of the axle.

The nut C is squared at the outer end, $f$, to receive the socket of the ordinary nut-wrench. I provide a wrench, one end of which fits the square part of the nut C at $f$. The other end fits the follower-nut E, so that a person can in the space of one minute's time take up any looseness in all the wheels without taking off a nut from the axles or replacing or changing any of the packing-rings, and the adjustment is much more perfect than can be obtained in any other way. I could employ the use of three or more studs on the follower-ring D, or I could allow portions of the ring itself to pass through the flange $f'$; but I prefer the manner shown. The nut throughout is made of metal best adapted for the purpose, is cheap, light, and never liable to be out of order.

Having thus described my invention, what I claim as new, and desire to secure by Letters Patent, is—

1. The combination, with the axle A and axle-box B, of an adjustable axle-nut, C, consisting of a movable follower-ring, D, (containing packing-ring $a$,) and studs $b\ b$, which fit loosely through holes $b'\ b'$ in the flange $f'$ of the nut C, and rest against the follower-nut E, threaded on the outer surface of the nut C, substantially as shown and described.

2. In an axle-nut, the combination of the nut C, follower-nut E, flange $f'$, and holes $b'\ b'$, with the follower-ring D, packing-ring $a$, and studs $b\ b$, all substantially as shown and described.

EDGAR P. HOLLY.

Witnesses:
J. E. EMERSON,
CHAS. G. VOKE.